June 23, 1970  M. DELL'AIRA  3,516,401
MULTIPLE-SPIROMETER RESPIRATION MEASURING DEVICE
Filed May 1, 1967  3 Sheets-Sheet 2
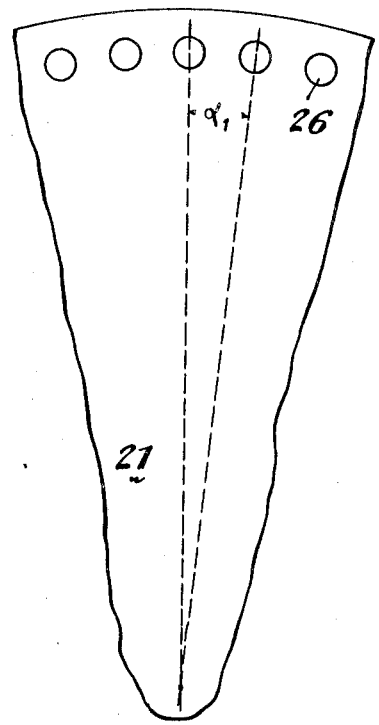
Fig. 2
Fig. 5
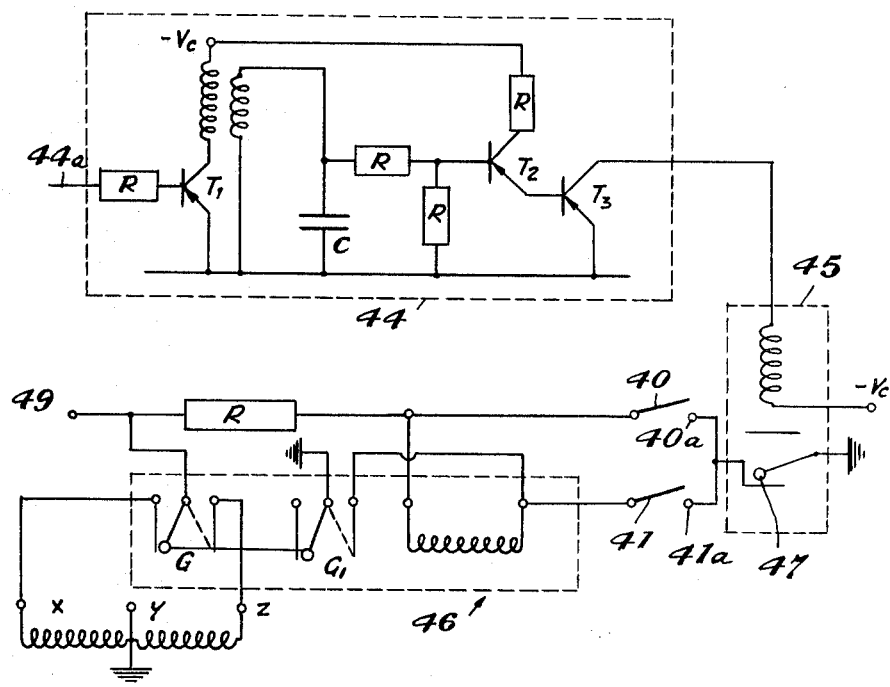
INVENTOR.
BY June 23, 1970          M. DELL'AIRA          3,516,401
MULTIPLE-SPIROMETER RESPIRATION MEASURING DEVICE
Filed May 1, 1967          3 Sheets-Sheet 3
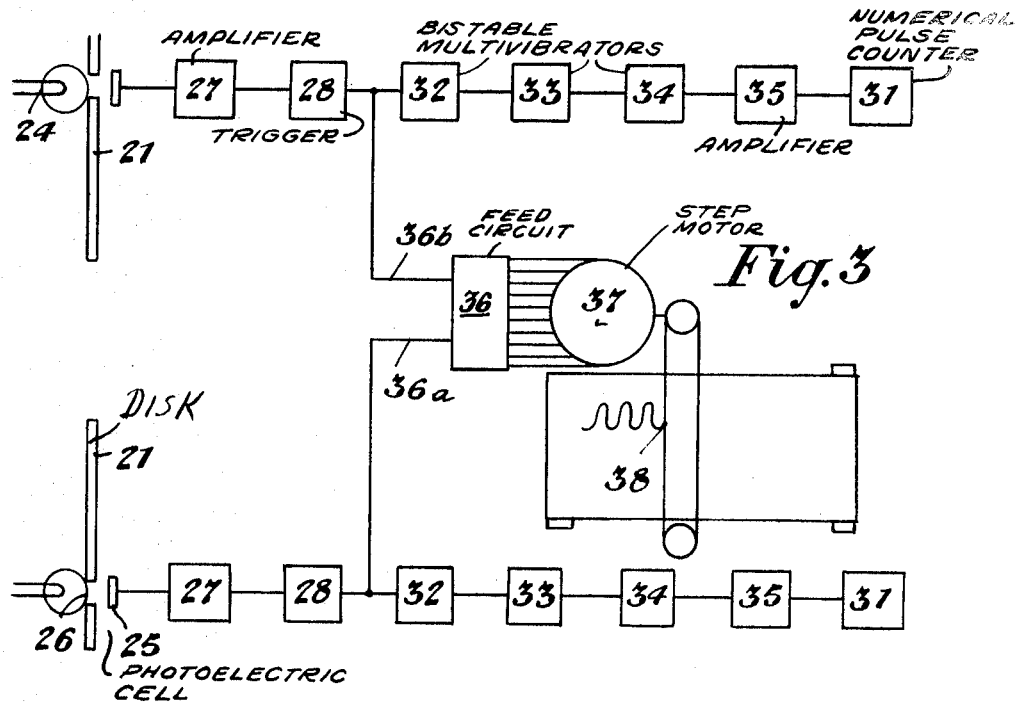
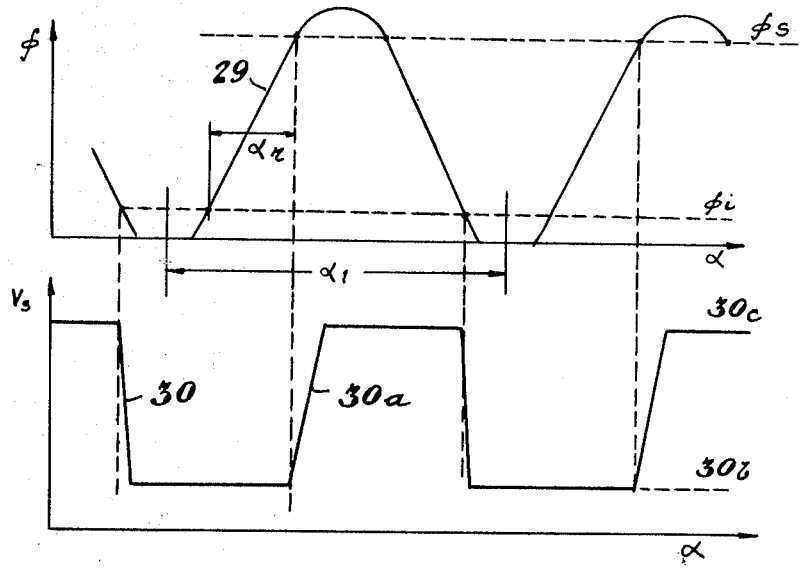
INVENTOR.
Michele Dell'Aira
BY United States Patent Office 3,516,401
Patented June 23, 1970

3,516,401
MULTIPLE-SPIROMETER RESPIRATION
MEASURING DEVICE
Michele Dell'Aira, Via Sacchi 9, Rome, Italy
Filed May 1, 1967, Ser. No. 635,020
Claims priority, application Italy, May 10, 1966,
10,617/66
Int. Cl. A61b 5/08
U.S. Cl. 128—2.08                                   6 Claims

ABSTRACT OF THE DISCLOSURE

An open type spirograph is disclosed having an inspiration circuit and an expiration circuit both connected to the respiration of the patient, whereby this open type spirograph yields one closed circuit type spirogram. Each circuit has a pair of spirometers or variable capacity containers. The containers of the expiration circuit cooperate with the measuring system whose information induces, in the recording unit, a proportional movement in one direction, while the containers of the inspiration circuit cooperate with the measuring system inducing in the same recording unit a proportional movement in the opposite direction, whereby, on a moving chart, the desired closed circuit type spirogram is traced.

Field of invention

My invention relates to the field of spirographs, i.e. the field of instruments for recording pulmonary volumes, and is so associated with measuring systems, as to yield that type of spirograms supplied by closed circuit type spirographs.

Known art

The known spirographs can be divided into two main types: closed circuit and open circuit spirographs. In the former, the respiration of the person under examination causes the rising and sinking of a single bell telescoping in a liquid filled tank, and the movements of the bell are traced on a moving chart. The resulting spirograms permit the determination of all pulmonary volumes, as well as oxygen consumption and they can be interpreted almost intuitively, since to the acts of inspiration and expiration there correspond oppositely directed movements of a recording device, and therefore the rising and descending legs of the spirogram traced.

However, closed circuit spirographs present many drawbacks. The inspired air comes from parts of the spirograph which are in contact with the expired air and where condensation of the water vapor contained in the breath occurs. Furthermore, owing to the fact that it is impossible to thoroughly sterilize such apparatus, it constitutes a potential source of infection, especially so, because such apparatus are also used in the diagnoses of respiratory diseases. In addition, spirographs applicable to tests conducted under effort present problems connected to the quantity of condensed vapors, the heat developing in the absorption of carbon dioxide and the pressure drop along their circuits. So far, these problems have not attained technically satisfactory solutions.

The open circuit type spirographs comprise two containers, whose bells are interconnected so that correspondingly to the rise of the bell receiving the expired air, the other bell, which is connected to the atmosphere, will sink into its tank. Each tank communicates either with the atmosphere or with the expiration circuit by a system of ducts and valves. The air is directly drawn in and inspired from the atmosphere and expired into that tank which is closed to the atmosphere and open to the expired air. When the bell which is rising under the pressure of the air expired into it has reached a given upper level, the closing of contacts will actuate valves which will open this bell to the atmosphere, switch the flow of expired air into the other bell and close the latter to the atmosphere.

The diagrams obtained from such spirographs do not permit the determination of all pulmonary volumes and of the oxygen consumption of the person under examination. However, open circuit spirographs present the advantage that during inspiration they are completely sealed off by a check valve and therefore, to prevent infection, it is sufficient to stelize the mouthpiece or mask into which the patient breathes. A further advantage of the spirographs of this type is that they do not present problems of vapor condensation or heat development.

The invention

The invention comprises a first or expiration assembly or circuit for the measurement of the expired air, having the general arrangement of an open circuit type spirograph, and a second or inspiration assembly or circuit, connected to it, having a similar but inversely operating arrangement for the measurement of the inspired air. The variable volume containers of the first assembly cooperate with a measuring system whose information induces, in a recording unit, a proportional movement in one direction, while the variable volume containers of the second assembly cooperate with a measuring system inducing in the same recording unit a proportional movement in the opposite direction, whereby, on a moving chart, the desired closed circuit type spirogram is traced.

The spirograph of the invention is completed by devices preventing measuring and recording errors.

For a better understanding of the invention a possible embodiment thereof will now be described with reference to the attached drawings, it being understood that this embodiment is to be intended as merely exemplificative and in no way limitative.

In the drawings:

FIG. 2 is an enlarged partial view of one of the perforate disks of FIG. 1;

FIG. 3 is a block diagram of the measuring and recording circuits of the embodiment;

FIG. 4 is a diagram of the signal transduction used in this embodiment;

FIG. 5 shows the valve commutation circuit thereof.

Figure 1:
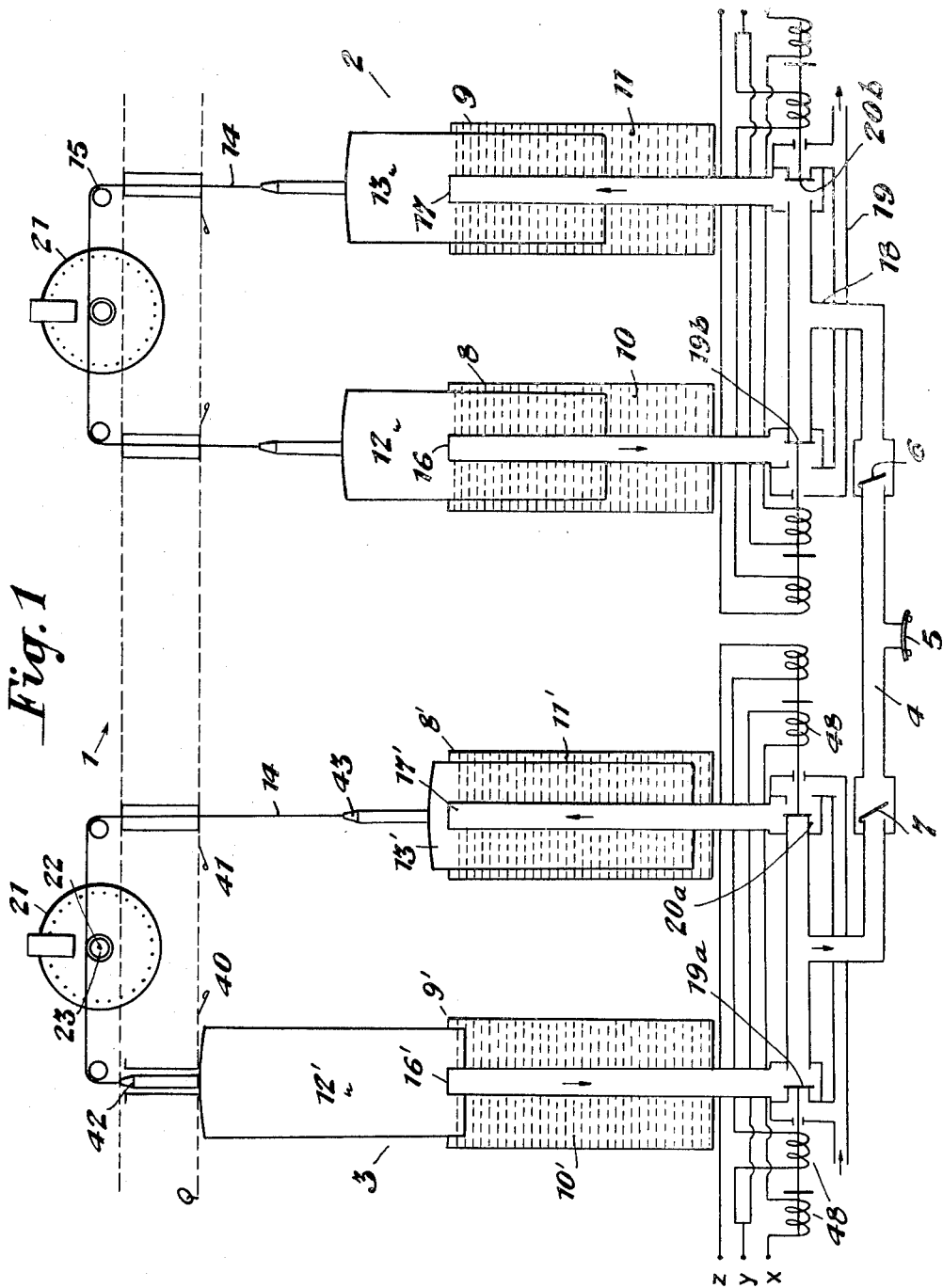
FIG. 1 is a schematic view of the embodiment of the invention.

The spirograph, generally indicated at 1, comprises an expiration assembly 2 and an inspiration assembly 3, which are connected, as by a common duct 4, to a mouthpiece 5 applicable to the mouth of the person whose respiration is being tested. A check valve 6 interposed between the mouthpiece and the expiration assembly closes and cuts off the latter during the process of inspiration, while a check valve 7 between said mouthpiece and the inspiration assembly cuts off the latter during the expiration process. Owing to this arrangement, these two assemblies are always completely separated from each other, and, similarly to the open circuit type spirograms, no air can be drawn in from the expiration circuit, thus eliminating any source of infection.

As mentioned, the mechanical structure of the expiration assembly 2 is practically identical to that of the known open circuit spirographs. It comprises the usual two variable volume containers 8 and 9, consisting each of a stationary liquid filled tank 10 and 11 respectively and of a bell 12 and 13 respectively telescoping in it. Obviously, in lieu of these bell and tank type containers, any other type of variable volume containers could be used.

The bells are interconnected, as by a cable 14, suspended over guide pulleys 15.

Through the interior of each tank there extends a tube 16 and 17 respectively, communicating it, on one hand, through a common duct 18 to tube 4 and mouthpiece 5, and, on the other hand, to the atmosphere through a common duct 19. A system of electromagnetic valves, such as valves 19b and 20b, to be described later in greater detail, is provided in the ducts, and switches the communication of the container, whose bell has reached a predetermined upper level, from the expired air circuit to the atmosphere, and the communication of the other container, which has reached its lowermost level, from the atmosphere to the expiration circuit. Owing to this arrangement, the container receiving the expiration will rise and the one connected to the atmosphere will descend in partial strokes, each stroke corresponding to the volume of the expired air. The inspiration assembly 3 is similar in construction to the expiration assembly 2 just described, except that the valve action is inverted with respect to it. The inspiration assembly also comprises two containers 8' and 9', tubes 16' and 17' connecting their interior to the mouthpiece and to the atmosphere respectively, bells 12' and 13' interconnected by a cable 14', valves 19a and 20a opening, under given conditions, that container to the atmosphere, which, owing to the depression caused by inspiring air from it, has reached a given lower limit and connect inversely the other container, which has reached a corresponding upper limit, to the respiration.

The problem of obtaining from such open circuit type assemblies a closed circuit type spirogram, wherein the expiration volumes are represented by rising legs and the inspiration volumes by descending legs of this curve, is solved by providing each assembly with separate signal generating units, each signal generating unit actuating a measuring system supplying the arithmetical sum of the partial strokes of the bell pair of the assembly.

The signal generating units are also connected to a common recording unit in such a manner, that the signals from one device impart to said unit a movement opposite to that imparted by the other unit, as it will be explained later. Since the signal generating apparatus and the measuring systems are identical in both assemblies, both in structure and operation, only one will be described. The signal generating unit proper comprises a disk 21 rotatably mounted on a shaft 22 and so connected to the cable 14, for instance by winding the latter a few turns around the disk hub 23, that a reciprocating movement of the bells 12' and 13' will produce in the disk clockwise and counterclockwise rotations, for an angle proportional to the partial strokes of the bells and therefore to the volume of the air inspired from one at every respiratory act.

Disk 21 is interposed between a light source 24 and a photoelectric cell 25 and is provided, correspondingly to them, with a circular row of equally spaced apart perforations 26. Owing to this arrangement, any rotation of the disk 21 and the consequent passing of the perforations between the light source and the photoelectric cell will result in the generation of a number of electric signals, this number being proportional to the length of the bell stroke and therefore to the inhalation volumes, but independent of the sense of rotation of the disk and consequently of the direction of the bell movement.

The variations of the light flux, represented by a curve 29, striking the photo cell produce voltage variations that are amplified in the amplifier unit 27 and transformed into a trapezoidal waveform 30 in a Schmitt trigger 28. Both curves are plotted against an angle of rotation $\alpha_1$, corresponding to a perforation pitch, of disk 21. Of this voltage waveform 30, only those leading edges 30a are utilized, which extend from a lower negative value 30b of the output voltage $V_s$ to an upper negative value 30c of output voltage $V_s$.

This type of voltage variation has the property of occurring only once for each rotation $\alpha_1$ and precisely when the increasing light flux striking the cell exceeds the value $\Phi_s$. The oscillation of the disk around its axis, caused by its inertia each time the bell stops between two consecutive inhalations, can set up repeated voltage variations only in the case, in which the amplitude of these oscillations $\alpha_o$ is such as to make the light flux oscillate between values below $\Phi_i$ and values over $\Phi_s$. To render such a case possible, it is necessary that the angle $\alpha_o$ is larger than the angle $\alpha_r$ between the points of intersection of curve 29 with $\Phi_i$ and $\Phi_s$, and $\alpha_o$ can be rendered very nearly equal to $\alpha_1/2$ by any convenient design. It can be shown that undesirable oscillations of such amplitude are impossible for the present device.

The number of light variations, and thus of the pulses generated is proportional to the inhaled volume.

The two variations occurring, one just before and the other just after the bells invert their stroke and thus the disk its sense of rotation, may occur for a total rotation (sum of the angles of rotations in both senses) which is either wider or narrower than $\alpha_1$; in the mean they occur for a total angle of rotation approximately equal to $\alpha_1$.

Therefore, it can be stated that in each assembly the signal generating unit supplies a series of voltage variations which are proportional in number to the volume inspired or respectively expired.

The pulses from each Schmitt trigger are reduced—through three bistable multivibrators 32, 33 and 34, each of which yields at its output a useful voltage variation for every two voltage variations applied to its input—by the factor 1:8. The pulses from the last multivibrator are amplified in the amplifier unit 35 and finally applied to a numerical pulse counter 31. The information from each counter, multiplied by a given factor, indicates the total number of liters inspired and respectively expired from the beginning of the test.

The output pulses from the two Schmitt triggers are also led to the two inputs 36a and 36b of the electronic feed circuit 36 of a step motor 37. Those applied to one input, for instance 36a, will cause the motor to rotate in one sense, those applied to input 36b will cause the motor to rotate in the opposite sense. The movements of the motor can be easily converted into alternating movements of a recording unit 38 resulting in reciprocating movements of a writing point and thus can be recorded, in the form of a closed circuit type spirogram, on a moving chart.

The commutation of the valves which connect the interior of the containers either to the atmosphere or to the mouthpiece must occur within the interval between successive partial strokes, when the bells stand still, because otherwise some inspired or respectively expired air would bypass the containers and would thus escape measurement.

To attain a commutation of this sort, I have applied to each assembly identical valve switching systems which commutate the valves only when two conditions are fulfilled: the first condition being that one bell has passed, during a partial stroke, a given limit position; the second condition, that it has completed said stroke and stopped.

To avoid repetitions, only the system applied to assembly 3 will be described in detail, since the one applied to assembly 2 is, as stated, identical to it.

It consists of an electronic switch 44, a control relay 45 connected to it and a valve switching circuit proper, comprising a double throw relay 46 actuating the solenoid valves 19a and 20a.

The succession of pulses produced in the signal generating system correspondingly to each partial stroke is applied to the input 44a of the electronic switch 44 and converted by it into a continuous signal. This signal is fed to the control switch 45 which is energized by it and disconnects from relay 46 a contact 47 which, when connected, grounds and contacts 40a and 41a of limit switches 40 and 41 inserted in parallel in the valve switching circuit. At each cessation of the continuous signal, correspondingly to each interval between partial strokes of the bells, control relay 45 is deenergized whereby the biased contact 47 is set free to ground contacts 40a and 41a. This realizes the condition that the switching circuit can operate only when the bells have stopped. As shown in FIG. 1, limit switches 40 and 41 are placed at a given upper level Q of assembly 3. Atop each bell 12' and 13' is applied an abutment 42 and 43 respectively. As it can be seen from FIG. 5, the actuation of either contact does not affect the valve switching circuit until contact 40a and 41a have been grounded by contact 47. If this condition is fulfilled, the closure of one limit switch or the other will effect the commutation of the valves. In the position illustrated in the FIG. 5, the relay controlled switches G are in the left position, whereby the terminals of circuit x–y are connected to the power source through the ground and the pole 49. The solenoids 48 (FIG. 1) are presumed having actuated valve 19a to connect container 10' to respiration, and valve 20a to connect container 11' to the atmosphere. Bell 12' is therefore descending and bell 13' is rising. When abutment 43 has closed the limit switch 41 and stopped at the end of the partial stroke which brought it to this level, the coil of relay 46 will be energized, will shift the switches G and $G_1$ to the right and thus switch the current from the circuit x–y to the circuit z–y. The solenoids of the circuit z–y will actuate valve 20a to switch bell 13' from the atmosphere to the respiration and valve 19a to switch bell 12' from respiration to the atmosphere. The reopening of limit switch 41 by the descending abutment 43 does not affect the position assumed by contact G and the valves 19a and 20a, until abutment 42 has not closed limit switch 40 and bell 12' has not stopped thereafter. When this occurs, the coil of relay 46 is inactivated, since also its other terminal is grounded by G, and thus G is released to re-assume its lefthand position in which it connects again the circuit x–y to the power supply.

Although the embodiment here more particularly described and illustrated combines the advantages of a very safe operation and extremely accurate recordings, it is obvious that many variants can be applied to it, without departing from the scope of the present invention. For instance in lieu of the bell and tank type containers, also bellows type containers can be used. Similarly the shape of the disk perforations and of the light beam passing through them can be varied, to produce a different light flux pattern. The perforations may also be replaced by areas capable of reflecting the light beam on the photoelectric cell, or the photoelectric cell and the light source can be replaced by magnetized particles passing before a magnetic head.

Also the electromechanic valve switching system can be replaced in many ways, as for instance by an electropneumatic valve switching system.

What I claim and desire to be protected by Letters Patent is:

1. A device for measuring respiratory volumes comprising:
   an expiratory circuit including at least one pair of expiratory variable volume container means interconnected to move in opposite directions for alternately receiving expired breath; and expiratory duct means leading to said expiratory circuit and adapted to receive breath at its other end from the person under examination;
   an inspiration circuit, including at least one pair of inspiration variable volume container means interconnected to move in opposite directions for alternately receiving external air, and inspiration duct means leading from said inspiration circuit and adapted to pass air to the person under examination, both said units being separated from each other;
   first valve means along said expiration duct to cut off said expiration circuit during inspiration;
   second valve means along said inspiration duct to cut off said inspiration circuit during expiration;
   third valve means in said expiration circuit, communicating one expiration variable volume container of the pair with the respiration air and closing it from the atmosphere throughout its inflation, while communicating the other of said pair of variable volume containers with the atmosphere and closing it from respiration until the end of said inflation;
   fourth valve means in said inspiration circuit, communicating one of said pair of inspiration variable volume containers with the respiration air and closing it from the atmosphere throughout its deflation, while communicating the other of said pair of inspiration variable volume containers with the atmosphere and closing it from respiration until the end of said deflation;
   switching means controlling said third and fourth valve means;
   first measuring means associated with said expiratory variable volume containers for measuring the volume variations thereof under the pressure of the air expired into them;
   second measuring means associated with said inspiratory variable volume containers for measuring their volume variations under the depression caused by the inspiration of air therefrom; and
   recording means associated with said first and second measuring means and actuated by said first measuring means to move in one given direction and by said second measuring means to move in the opposite direction, to record thereby the respiraiton volumes in a closed circuit type spirogram.

2. The device in accordance with claim 1 further comprising means for rendering said valve switching means operative only in the interval between partial inflation and deflation of said containers; and limit means, actuated by abutment means moving concomitantly with each of said containers during inflation or deflation thereof, for controlling said switching means to in turn effect control of said third and fourth valve means only after one of said containers has expanded or deflated beyond a given limit level.

3. A device according to claim 2, wherein the valve switching system of each said circuit comprises:
   an electronic switch receiving pulse successions from a signal generating device during the partial inflations or deflations of said containers and converting each pulse succession into a continuous signal;
   a control relay energized by said continuous signal;
   a two-throw relay governed by said control relay;
   a valve switching circuit comprising solenoids, the direction of the current in said solenoids being controlled by said two-throw relay;
   limit switch means inserted in said switching circuit, coacting with abutment means moving concomitantly with said containers, to close and open the circuit of said relay;
   means actuated by said first relay, to close the connection of said valve switching circuit to a power source when said relay is energized by said continuous signal and to open said connection when said first relay is deenergized by the cessation of said signal.

4. A device according to claim 1, wherein each measuring means comprises:
   a pulse generating means associated with said interconnected variable volume containers, to emit signals proportional to the length of the partial strokes of said containers;
   pulse counting means connected to said signal generating means.

5. A device according to claim 4, wherein each pulse generating means comprises:
   a light source emitting a beam of light;
   a photoelectric cell;

a movable support interposed between said light source and said photoelectric cell, said support being associated with said containers to move proportionally to their volume variations;

a circular row of equally spaced apart aperatures provided in said movable support;

a Schmitt trigger connected to said photoelectric cell and converting into pulses the voltage variations induced in said photoelectric cell by the light beam hitting it during the passage of said perforations between it and said light source.

6. A device according to claim 5, further comprising:

a step motor; and a feeder circuit having two inputs, whose output is connected to said step motor, one of said inputs being connected to the output of the pulse generating device of said expiration circuit the first assembly, to induce in said motor a proportional rotation in one sense, the pulse generating device of the second assembly being connected to the other input of said feeder circuit, to induce with its pulses in said motor a proportional rotation in the opposite sense;

a recording device connected to the motor, converting the rotations of said step motor in ascending and descending legs of a closed circuit type spirogram.

References Cited

UNITED STATES PATENTS

| | | | |
|---|---|---|---|
| 1,988,221 | 1/1935 | Soskin | 128—2.07 |
| 2,427,145 | 9/1947 | Koehler et al. | 128—2.08 |
| 3,081,766 | 3/1963 | Dubsky et al. | 128—2.08 |

FOREIGN PATENTS

| | | |
|---|---|---|
| 1,252,549 | 12/1960 | France. |

OTHER REFERENCES

"The Lancet," Sept. 18, 1965, pp. 573 and 574.

WILLIAM E. KAMM, Primary Examiner

UNITED STATES PATENT OFFICE
CERTIFICATE OF CORRECTION

Patent No. 3,516,401                       Dated June 23, 1970

Inventor(s)  Michele DELL'AIRA

It is certified that error appears in the above-identified patent and that said Letters Patent are hereby corrected as shown below:

Substitute the following for claim 6 in the Letters Patent:

Claim 6. A device according to claim 4, further comprising:

- a step motor; and

- a feeder circuit having two inputs, whose output is connected to said step motor, one of said inputs being connected to the output of the pulse generating device of said expiration circuit, to induce in said motor a proportional rotation in one sense, the pulse generating device of said inspiration circuit being connected to the other input of said feeder circuit, to induce with its pulses in said motor a proportional rotation in the opposite sense.

SIGNED AND
SEALED
OCT 13 1970

(SEAL)
Attest:

Edward M. Fletcher, Jr.
Attesting Officer

WILLIAM E. SCHUYLER, JR.
Commissioner of Patents